United States Patent [19]
Carlson

[11] 3,803,343
[45] Apr. 9, 1974

[54] ENCLOSED CABLEBUS SETUP

[76] Inventor: Elmer T. Carlson, P.O. Box 18, 202 Brood Hill Rd., West Cranby, Conn. 06090

[22] Filed: Sept. 12, 1972

[21] Appl. No.: 288,249

[52] U.S. Cl. ............... 174/71 B, 138/155, 138/159, 174/68 B, 174/68 C, 285/121, 285/183
[51] Int. Cl. ............................................. H02g 5/06
[58] Field of Search ..... 174/16 B, 68 B, 68 C, 70 B, 174/70 C, 71 R, 71 B, 72 R, 72 B, 72 C, 88 B, 99 B, 99 E, 100, 101; 339/22 B; 138/155, 158, 159; 285/121, 127, 182, 183

[56] References Cited
UNITED STATES PATENTS

| | | | |
|---|---|---|---|
| 1,986,965 | 1/1935 | Frank | 174/68 C UX |
| 1,992,574 | 2/1935 | Jenkins | 174/68 C UX |
| 2,218,016 | 10/1940 | Anderson | 174/88 B X |
| 2,223,300 | 11/1940 | DeBellis | 174/101 X |
| 3,003,794 | 10/1961 | Burley | 174/68 C UX |
| 3,351,699 | 11/1967 | Merckle | 174/68 C X |
| 3,504,097 | 3/1970 | Carlson | 174/68 B |

FOREIGN PATENTS OR APPLICATIONS

| | | | |
|---|---|---|---|
| 742,393 | 12/1932 | France | 285/127 |

Primary Examiner—Laramie E. Askin
Attorney, Agent, or Firm—Jackson, Jackson & Chovanes

[57] ABSTRACT

An enclosure for a cablebus includes two members which are pressed together on the sides of the cable. One member embodies a U-shaped piece, involving straight sides on the U which terminate at the ends of the sides, and a second piece of U-shape having a base and straight sides which operate within the first piece, in which the sides are parallel with the sides of the first piece and terminate at the ends of the sides of the first piece. The cable is contacted by the base of the U of the first piece and the base of the U of the second piece which exert pressure on it. The ends of the first piece have flanges on three sides, which are connected to similar flanges in prolongation on a similar piece. The ends of the second piece have flanges on the base of the U which are connected to flanges on a similar piece in prolongation. There are fillers which remain in fixed position as joint covers at the ends of the second piece. Special pieces are provided for leading the cable around corners for extending cables and making connection to other cables.

13 Claims, 16 Drawing Figures

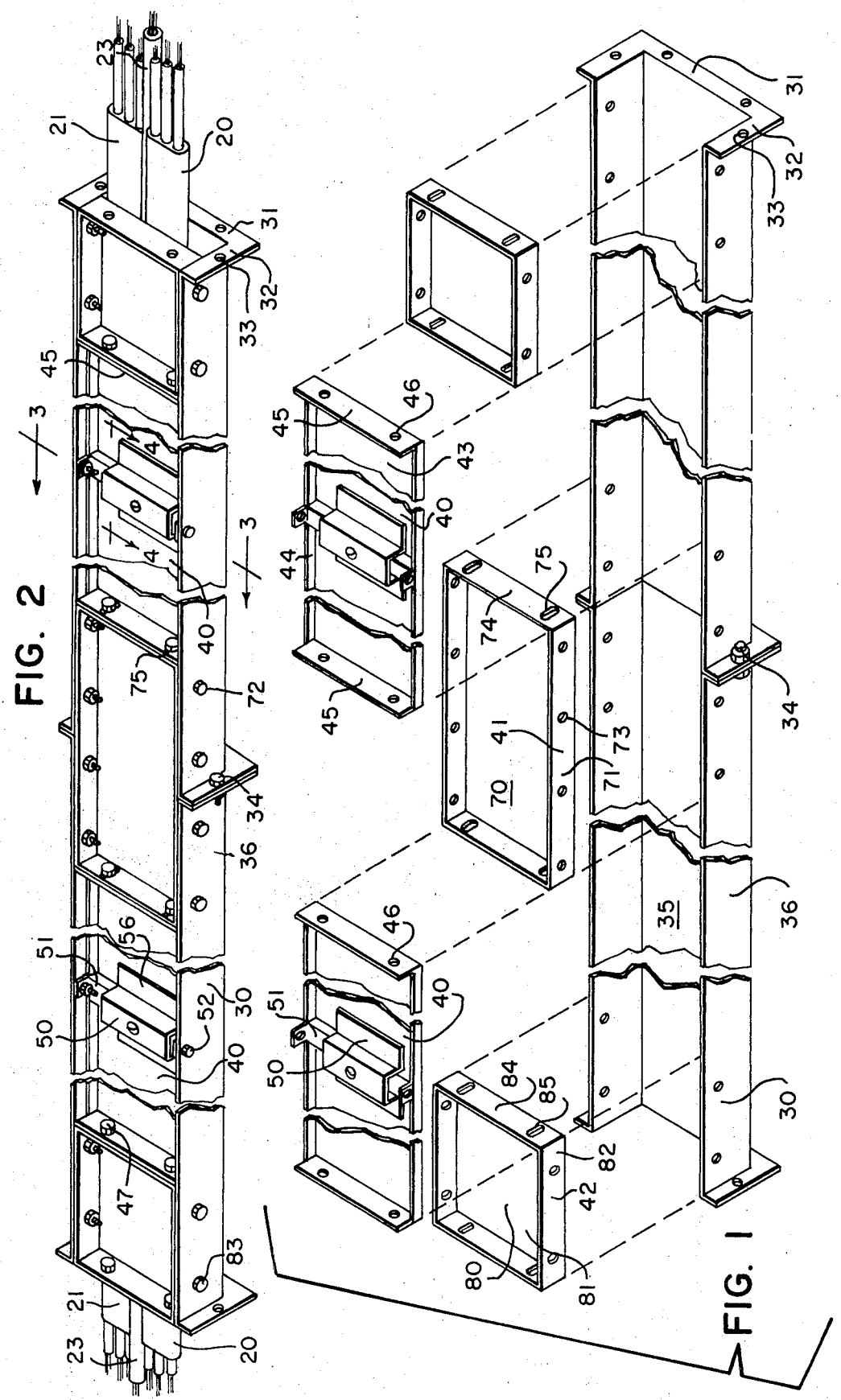

ENCLOSED CABLEBUS SETUP

DISCLOSURE OF THE INVENTION

In my U.S. Pat. Nos. 3,504,097, 3,614,297 and 3,644,663 the art of designing and installing electrical distribution feeder systems in buildings to increase ampacity of insulated stranded flexible lay copper and aluminum wires, job site installed, is developed in a totally enclosed metal protective enclosure. I have now improved these cablebus designs and confirmed by actual tests made at the Underwriters' Laboratories, Inc. that suitably designed conductors installed in totally enclosed cablebus equal or exceed the ampacity of equal size single conductors in free air as stated in Table 310-13 of the National Electrical Code. For example, U.L. test shows Number 6 AWG Copper rated 70 Amperes at 90° C. according to Table 310-12 of the National Electrical Code has ampacity of 115 amperes in my totally enclosed cablebus. These ampacities represent a substantial gain (over 50 percent) as compared with allowable ampacities of wires in a totally enclosed raceway approved for installation according to Table 310-12 of the National Electrical Code.

This increased ampacity derives from product design and installation procedures that result in the installed feeder system operating with intimate compressed surface engagement of conductors to the metal enclosure which functions as a heat sink and a heat radiator of transmission power losses to surrounding air. In ordinary totally enclosed raceways the heat from the power loss is retained by internal air spaces and requires increased conductor size to maintain insulation temperature at safe operating levels.

By the present invention I increase the ampacity of electrical feeders. Conductor material is saved. Weight is reduced. Less building space is required. Light weight reduces the manual effort to install and lowers installation labor costs.

Safe system performance reliability of total enclosures is provided, as well as good voltage maintenance on the system. Conductors are readily replaced to meet the demand for increased ampacity.

Modern buildings, as well as modernization of existing structures, confront the designer and installer of electrical distribution systems with cost problems, problems of finding available building space, and meeting system load growth requirements. This new totally enclosed cablebus is created to alleviate these problems in electrical distribution systems which are installed in exposed and accessible locations in buildings in three major ways:

1. to increase the ampacity of feeders up to 50 percent;
2. to reduce the size and weight of feeders up to 50 percent;
3. to provide for safe installation and system growth.

This patent application deals with providing safe installation and system growth and illustrates the design and construction of totally enclosed cablebus systems that make practical and economical the benefits of increased ampacity and reduced size and weight.

It should be carefully noted that the ampacities of totally enclosed cablebus relate not to conductors as in ordinary wiring systems practice but to installed ampacities of integrated runs including straight lengths, turn and connector fittings, and enclosed conductor circuits. A totally enclosed cablebus installation run has a total product ampacity rating based on predetermined laboratory tests, and such ampacities on each enclosure component relate to approved identified conductors.

Components of totally enclosed cablebus are standardized as to functions and dimensions for selection and installation as fittings in sequence as vertical and horizontal runs from a source of load.

FIG. 1 is an exploded perspective of components of a cablebus.

FIG. 2 is an assembled perspective showing the components of FIG. 1.

Figure 6:
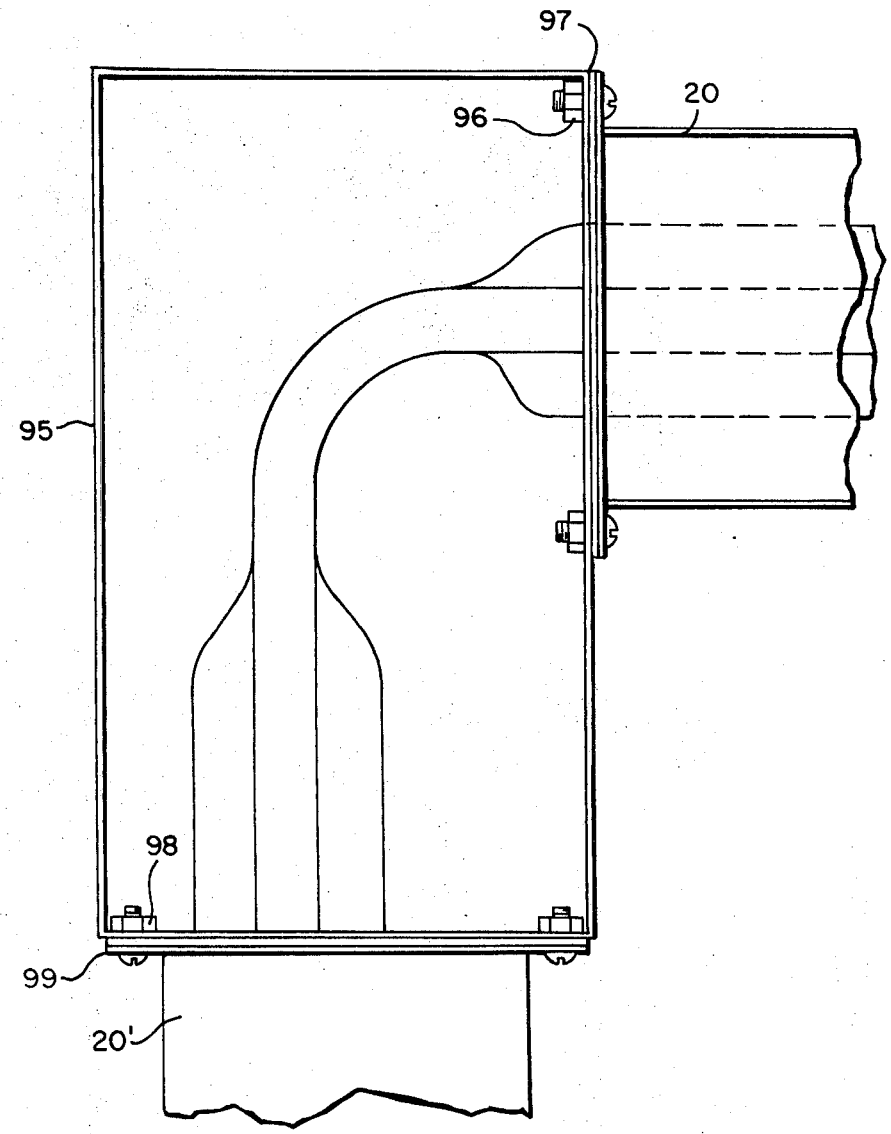
FIG. 6 is a general view of an installation showing a right angle turn, looking down on the cables and looking into an opened box.

1. to make a straight through wire connection;
2. to make continuous wire turns as in FIG. 6;
3. to make turn wire connections;
4. to combine with edgewise elbows to make straight through wire connections;
5. to combine with edgewise elbows to make flat to edgewise through wiring connections.

Figure 14:
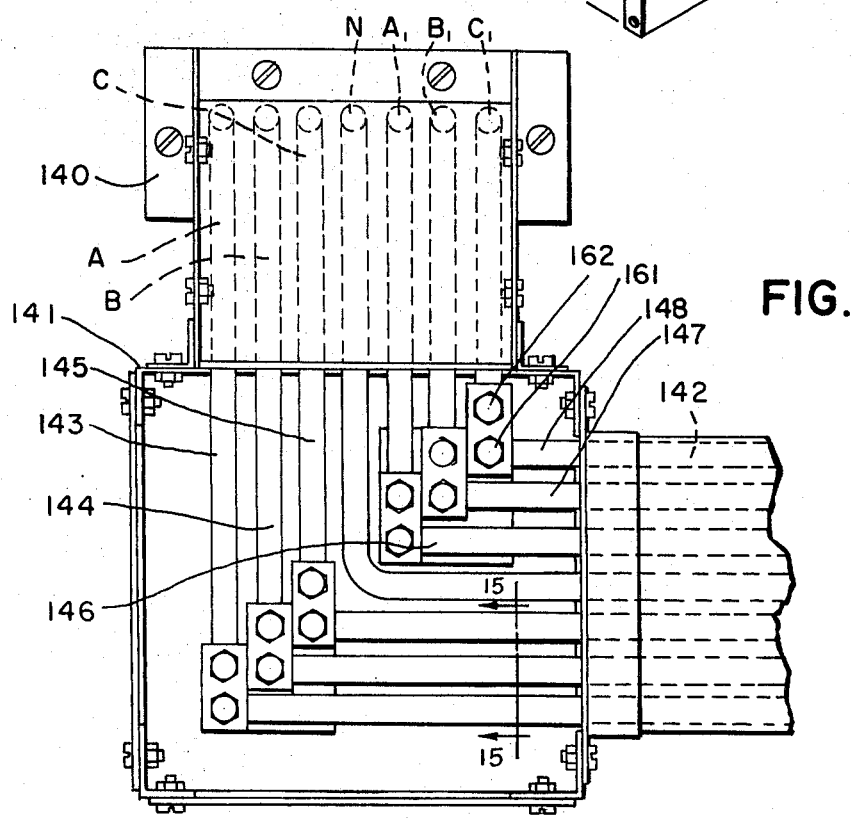

FIG. 14 is a cablebus transition flatwise to edgewise mounting through a connector box with compression terminal connectors.

Figure 15:
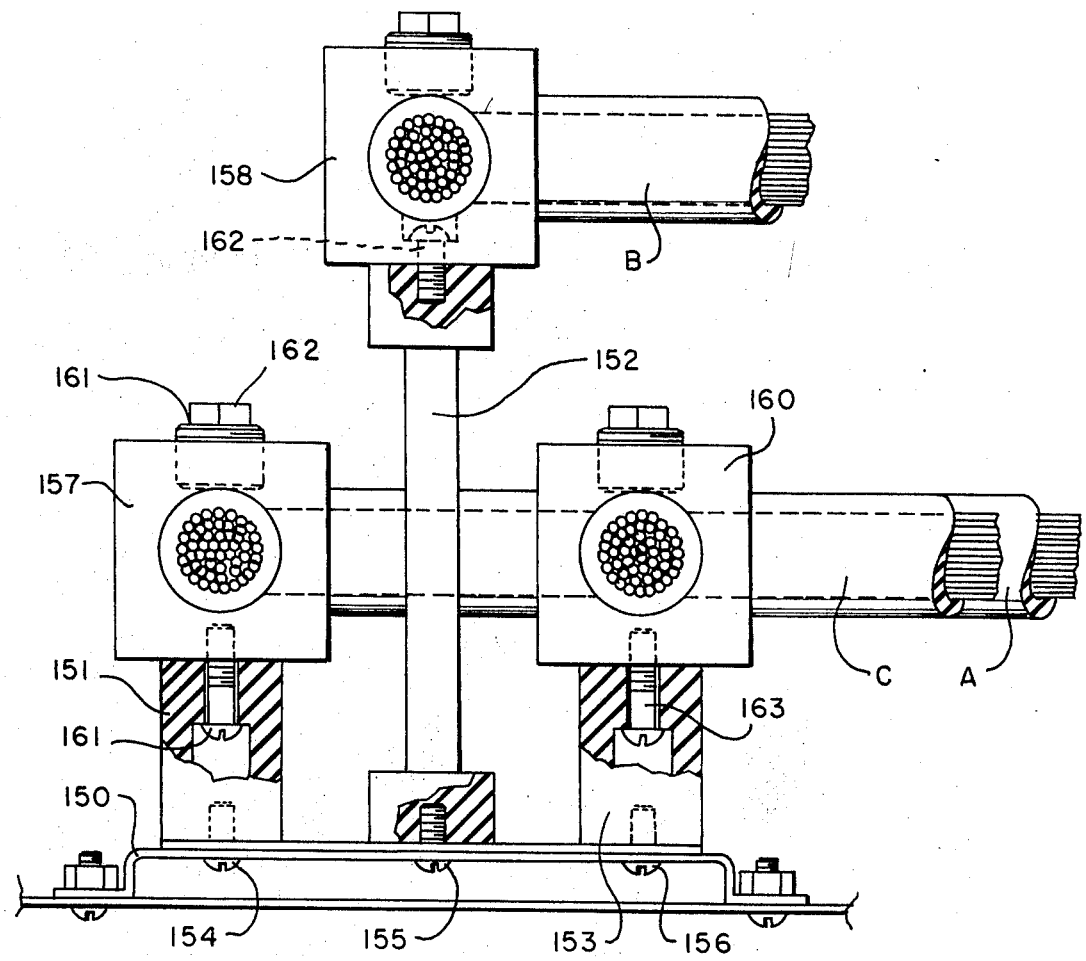

FIG. 15 is a section of FIG. 14 on the line 15—15 to enlarged scale.

Figure 16:
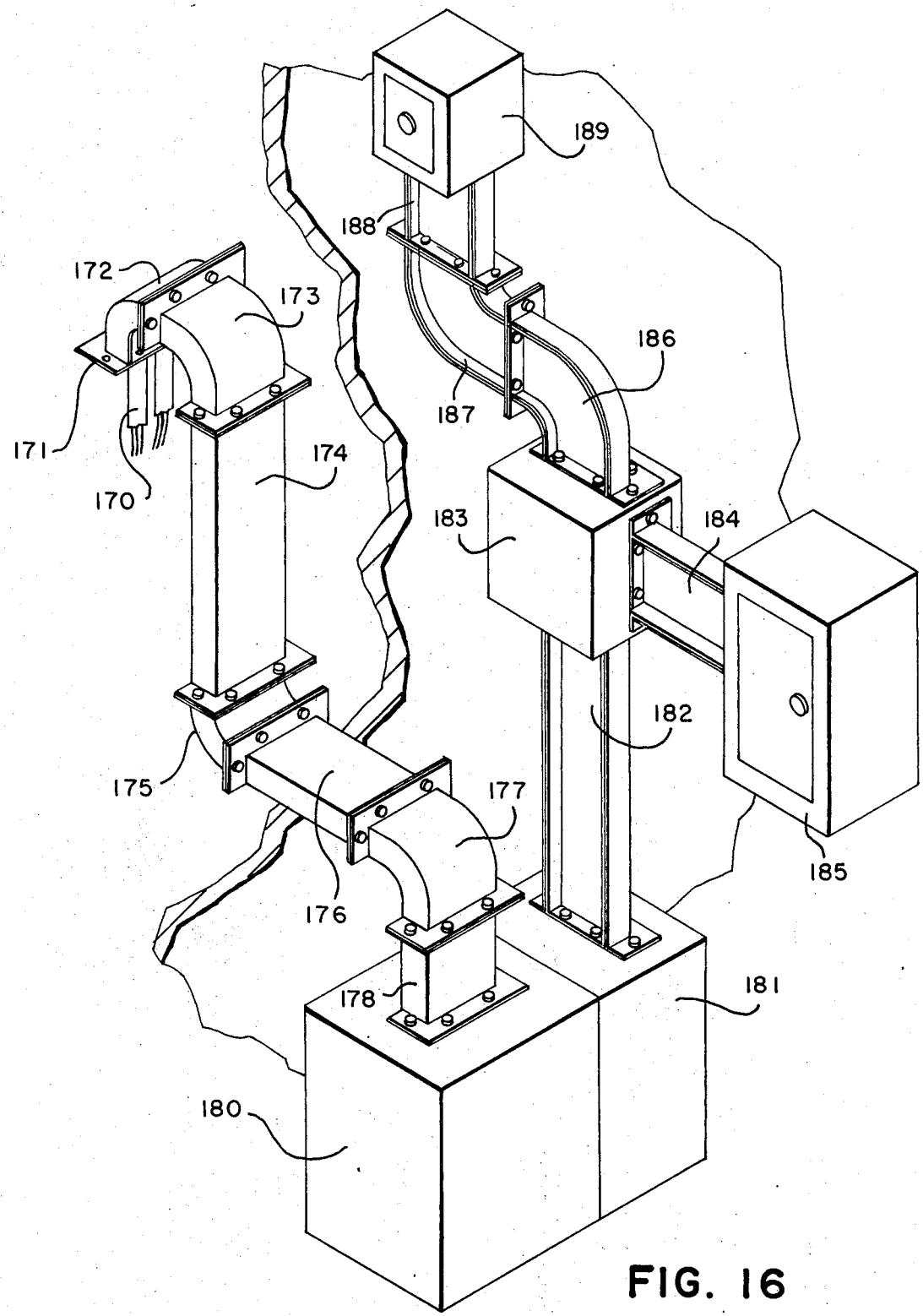

FIG. 16 is a perspective of a typical totally enclosed cablebus riser diagram.

Considering FIGS. 1 to 4, the components and connections for selection and installation as feeders in sequence as vertical or horizontal runs in buildings from the source to the load are shown. This involves two types of covers:

a. with controllable covers;
b. with fixed open position covers.

Controllable covers are made in lengths such as 10 feet, 5 feet, 4 feet, 3 feet and 2 feet, with cover controls spaced two feet apart. Fixed position lengths are employed as short connectors two feet or less, such as joint covers.

Figure 3:
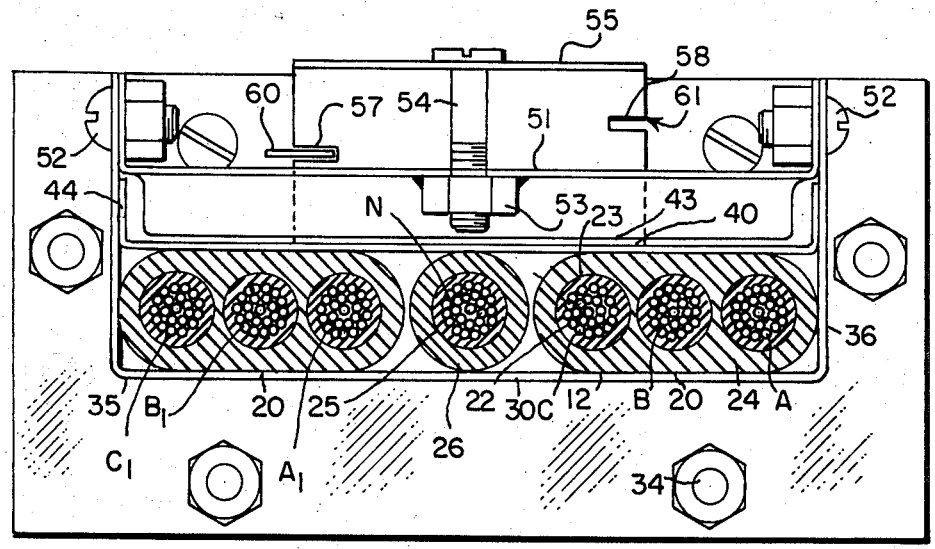
FIG. 3 is a section of FIG. 2 on the line 3—3.
Figure 4:
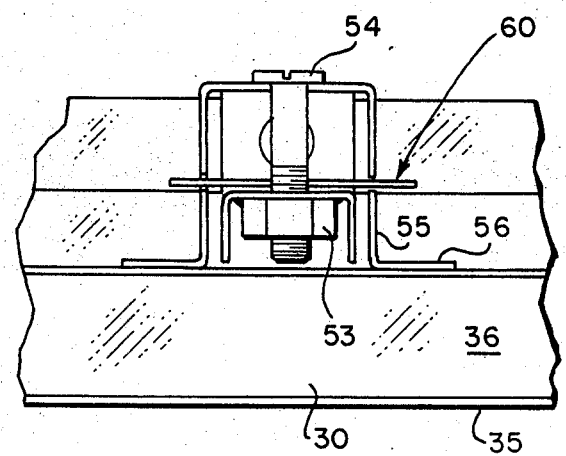
FIG. 4 is a section of FIG. 2 on the line 4—4.

The preferred form of cable for three phase alternating current is a flattened cable 20 having two broad flat parallel sides 21 as shown in FIG 3. Conductors consisting of separate wires concentric lay are shown at 22 having conductor insulation 23 and cable insulation 24. These are wired up for circuits A, B and C and $A_1$, $B_1$ and $C_1$ as shown and the neutral N is within a separate conductor insulation 25 and jacket insulation 26 which is substantially round in cross section.

Channel 30 is a rigid structure U-shape having end flanges 31 at the base of the U and 32 on the straight sides of the U which have holes 33 connected by bolts 34. In each channel as shown there is a base of the U 35 and sides of the U 36 which are straight and which end at the bottom without any extension thereof.

The duct is completed by a cover, which may be either a movable cover 40 or a fixed cover 41 or 42. The movable cover 40 is preferably 9 feet long and the fixed cover 41 is preferably one foot long while the fixed cover 42 is preferably 6 inches long.

The movable cover 40 is U-shaped in cross section, and comprising a base of the U 43 which is of a length which exactly fits within the channel 30 while the arms of the U 44 lie against the arms of the channel 36 and are of sufficient length to keep the cover 40 straight.

The arms of the U 44 are straight and sufficiently short that they will not interfere with the expansion and contraction as required to allow the cables to pass through into the cablebus and to allow the cables to be compressed on their flat sides. The movable cover 40 has at the ends of its base flanges 45 which are provided with holes 46 to receive bolts which operate in similar flanges to be discussed on the fixed covers. Bolts 47 pass through them.

The tightening mechanism 50 is distributed about every two feet along the cover 40. This consists at such a point of a bridge 51 extending across and anchored to the sides of the channel by bolts 52 through the sides of the U of the channel. This bridge in the middle has a nut 53 spot welded to the bridge and provided with an opening in yoke 55 through which a bolt 54 passes. This bolt passes through the middle of a yoke 55 which is secured at both sides to the movable cover at 56.

Accordingly, tightening of the bolt 54 brings the bridge and the yoke together and thus closes the passage by the cover movement in the enclosure in which the cables are contained while loosening of the bolt 54 releases the cover to permit widening the passage on the two sides of the cable.

Notch 57 receives a slider fork 60 which by pressure of bolt 54 holds the cover in total open position. Notch 58 receives a slider fork 61 to lock the cover in partial open position loosening pressure of bolt 54 and removing the slider released bolt 54 to function.

Stationary cover 41 is of U-shape and involves the base of the U 70 and the sides of the U 71 which go down on the inside of the channel and are bolted to the sides of the channel by bolts 72 through holes 73. As previously stated, the stationary cover 41 bridges between two channels and at its ends has flanges 74 which have elongated slots 75 to receive bolts on the ends of the movable covers.

At the ends of the run, there are fixed covers 42 which do not bridge but are short to fill the remaining distance at each end (6 inches). These have U-shape 80 which has a base of the U 81 and sides of the U 82 which receive bolts 83. This has flanges 84 at the ends, and it has elongated holes 85 which receive bolts 47.

Figure 5:
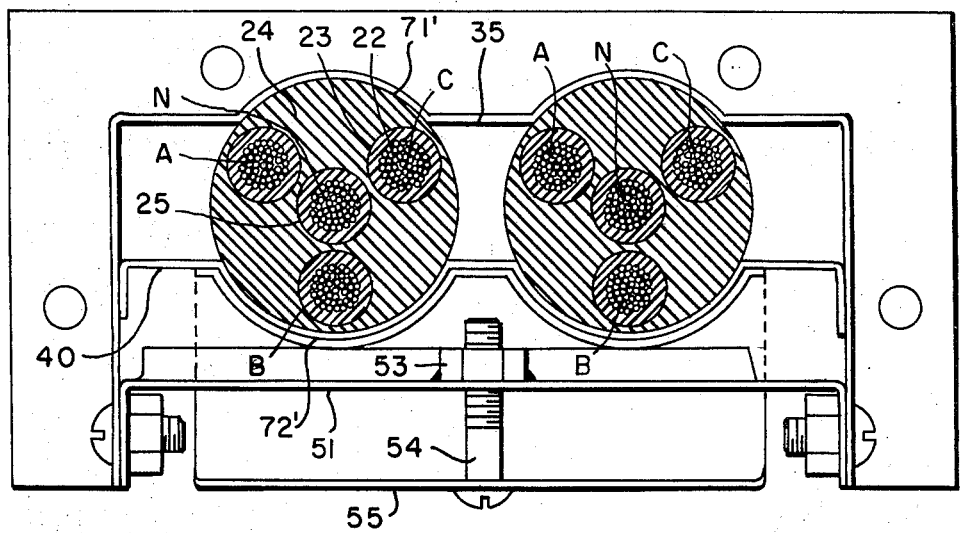
FIG. 5 is a section in line with FIG. 3 of an installation involving circular cable.

In FIG. 5 the cables, instead of being flat, are round on the outside of the cable insulation and the neutral N is in the center instead of being in a separate cable. The conductors are insulated by insulation as shown which shapes out the cable to the round form as indicated. The channel 30 has canals 71' formed from the base of the U 35 and running longitudinally and all of the covers, including the movable cover 40, have corresponding channels 72' formed from the base of its U. When the clamp 54 is tightened, it brings pressure on the cable between the channel and the cover as in FIGS. 1 to 4.

Figure 7:
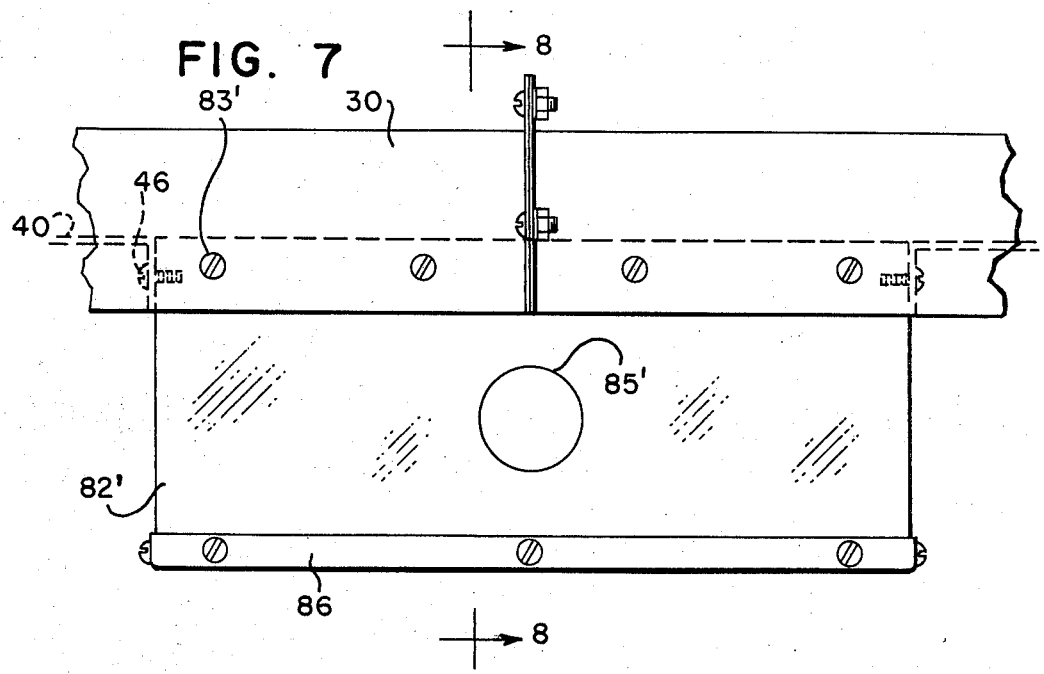
FIG. 7 is a side view showing a cablebus joint and box.
Figure 8:
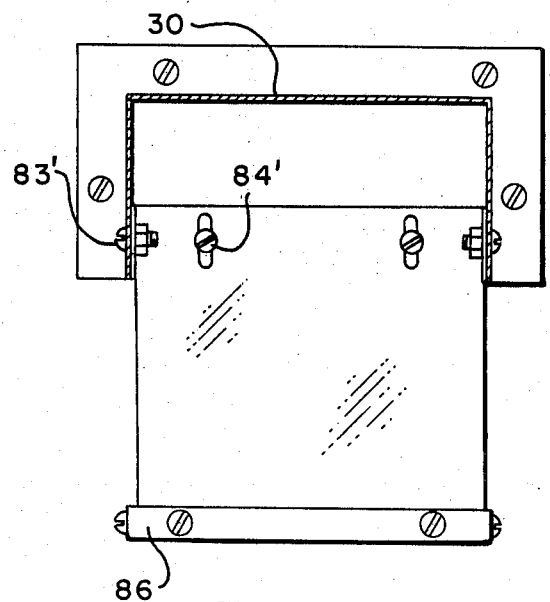
FIG. 8 is a section of FIG. 7 on the line 8—8.

In FIGS. 7 and 8 a bottomless box 82' is held in two meeting channels 30 by screws 83' between the sides and screws 84' to the end flanges 46 of the adjoining movable covers 40. If one desires to connect a branch circuit through a conduit, a knock-out 85' may be used. Cover 86 provides access to wires.

Figure 9:
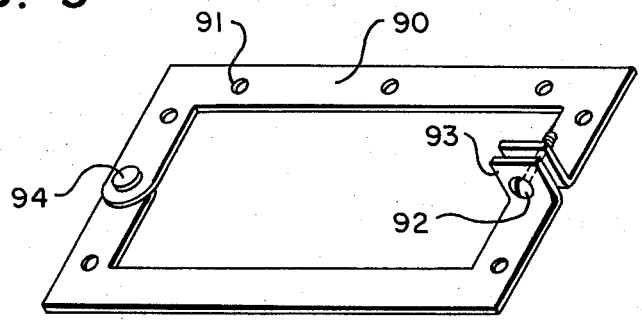
FIG. 9 is a perspective view of a hanger for the cablebus.

For hanger purposes (FIG. 9) hanger 90 can be used preferably by using mounting holes 91 held to flanges 31 and 32. The hanger is opened by removing bolt 92 held by ears 93 and pivoting at pivot 94.

Feeders in buildings transmitting power from widely separated locations of source equipment and distribution points encounter building elevations and installed obstacles that require various types of enclosure and conductor connectors for making turns in a run. Such fittings are hereinafter described by FIGS. 6, 10, 11, 12, 13, 14, 15 and 16.

A range of various standardized fitting types for assembly with straight lengths in suitable sequence have several purposes:

1. Wires can be installed in straight runs and through turn fittings without "pulling" strains that might injure insulation.

2. Effective heat transfer is provided at turns of a run.

3. Wiring installations continuous from source to load.

4. Wiring connections required at turn fittings shall be readily accessible, reliable and safe.

FIG. 6 illustrates a box 95 having its cover removed which is fastened at 96 to an end plate 97 and a cable 20 at one side and at 98 to an end plate 99 and a cablebus 20' at right angles thereto. The cables 20 in this form are twisted 90° axially, turned 90° laterally and untwisted 90° in passing through the box to eliminate the stresses of turning the varying radii of the flat conductor assembly, through the turn.

Figure 10:
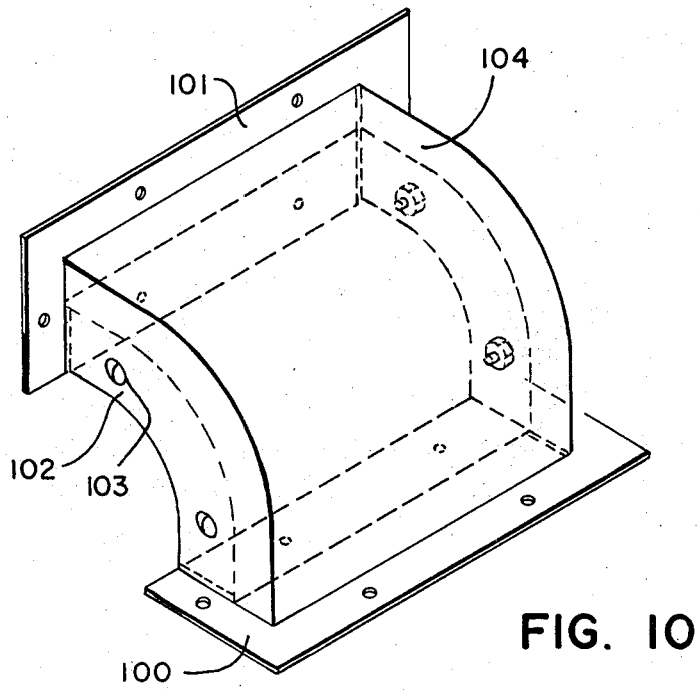
FIG. 10 is a perspective showing an internal edgewise elbow.

FIG. 10 is an interior edgewise elbow which connects to one cablebus by flanges 100 and connects to the other cablebus around the bend by flanges 101. Cover 102 is retained by bolts 103 to inner and outer elbow flanges 104 and is removable to permit forming wires into the open curved channel for continuous passage in the run. Flanges 104 are bolted to flanges with slotted holes of connected run components.

Figure 11:
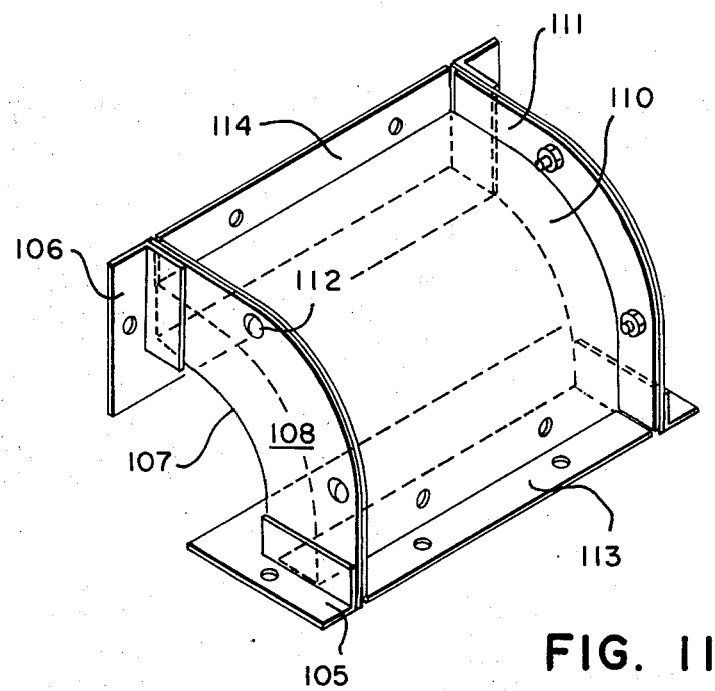
FIG. 11 is a perspective showing an external edgewise elbow.

In FIG. 11 an external edgewise elbow is shown which has flanges 105 to connect to the flanges at the ends of one channel, and flanges 106 to connect to the flanges at the other end of the other channel 90° removed from the first. On the inside of the elbow, there is an inside bend 107 connected to the ends 108. On the outside of the channel there is an outside bend 110 having flanges 111 against the end pieces 108 and connected thereto by removable bolts 112. At the end of the outside bend 110 there is a flange 113 which connects to the corresponding flange on one cablebus and at the other end there is a flange 114 which connects to the corresponding flange on the cablebus at right angles to it.

Figure 12:
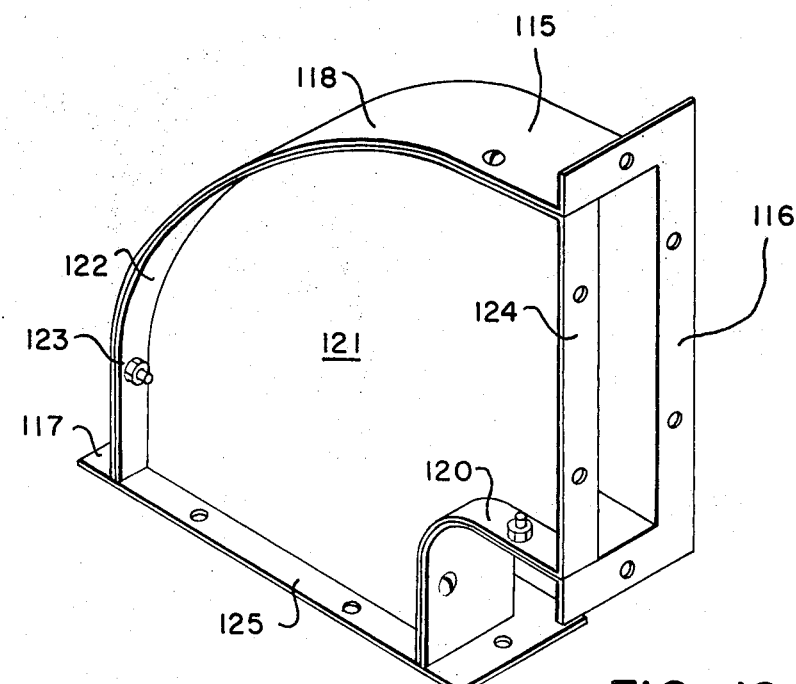
FIG. 12 is a perspective of a flatwise elbow.

In FIG. 12 there is a flatwise elbow which has one piece 115 which has one end flange 116 which connects to the corresponding channel on one run of cablebus and there is a corresponding flange 117 which connects to the channel at the other run of cablebus 90° offset from the first run. The piece 115 has outer portions 118 and inner portions 120. There is a separable piece 121 which has attached rims 122 which is connected by bolts 123 to the outside or inside pieces 118 and 120, and also end flanges 124 at one end and 125 at the other end which are connected removably to the corresponding end flanges of the corresponding run of cablebus.

Figure 13:
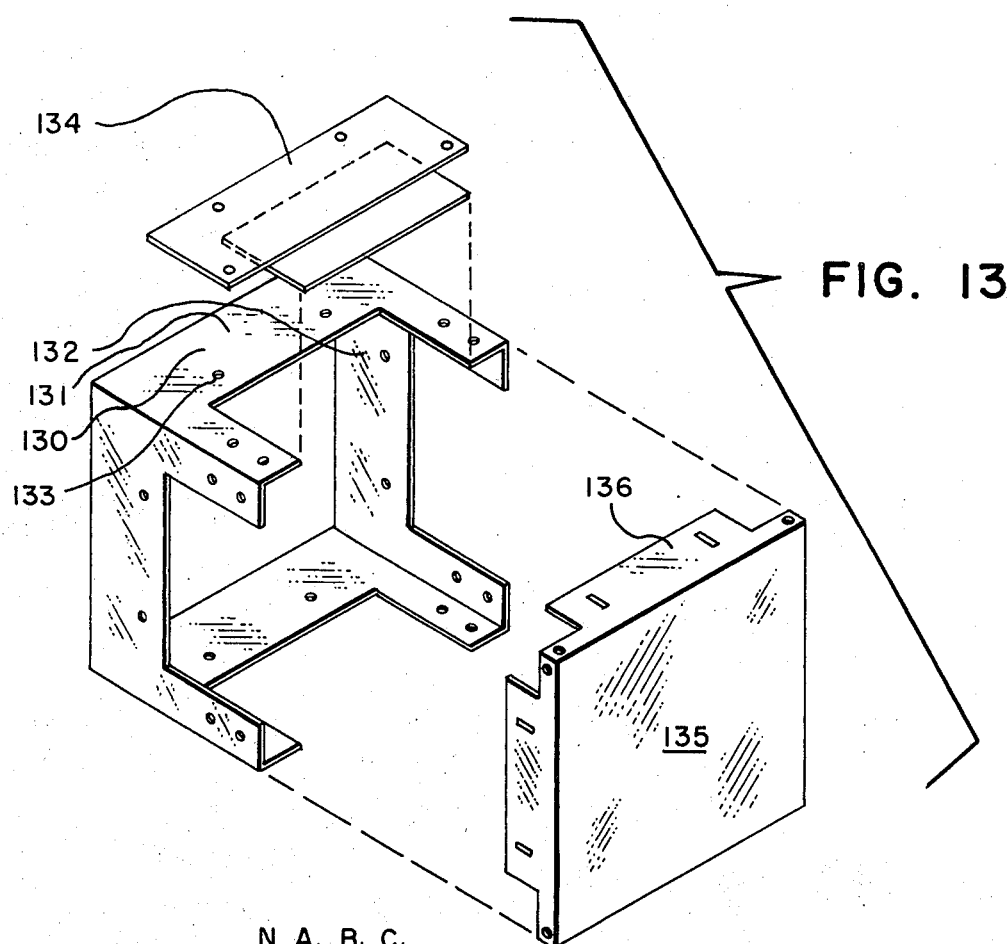
FIG. 13 is an exploded perspective of a connector box which has the following functions.

FIG. 13 is a connector box which as already stated performs several functions including the function of making straight through wire connections, the function of making continuous wire turns, the function of making turn wire connections, combined with edgewise elbows to make straight through wire connections or the function of combining with edgewise elbows to make flat edgewise through wire connections.

A basic box 130 has no top, but is provided with sides 131 having cutouts 132 and bolt holes 133. There is an optional opening closure plate 134 with rabbet which is provided with holes to cooperate with the bolt holes 133 and a cover 135 with a rabbet on all four sides and cover extensions from the sides 136 with elongated bolt holes to match the position of bolts in the flange of the corresponding run of cablebus.

FIG. 14 shows the connection of runs at right angles with a connector box having its cover removed. This is a flatwise to flatwise cable connection made with compression type terminal connectors in the connector box. This shows an external edgewise elbow to a leg of a flatwise run 140 connected to a box 141 which is connected to a run of cablebus 142. These cable circuits A, B and C and $A_1$, $B_1$ and $C_1$ and neutral N are connected by separate insulated compression connectors 143, 144 and 145 and also 146, 147 and 148 with corresponding cables as shown in FIG. 15. The neutral wire is bent and led over in the appropriate position in the new straight length to the leg of edgewise run. Methods long established and many materials well qualified may be employed to join wires in this connector box straight through or at right angles.

In FIG. 15 there is a metallic mounting 150 which by insulating blocks 151, 152 and 153 held by screws 154, 155 and 156 holding metallic connectors 157, 158 and 160 by mounting screws 161, 162 and 163, which of course are insulated from the screws 154, 155 and 156 respectively. These connectors 157, 158 and 160 have compression screws 161 and 162 which hold the respective cables.

As a typical illustration of a riser system, FIG. 16 shows the conductors 170 from outside the building passing through an insulated panel 171 into the riser system of the present invention. Two internal elbows 172 and 173 which function as a weatherhead enter a straight length 174 which clamps and supports the conductors 170 and then turns them through an external elbow 175 to a straight length 176, an internal elbow 177 and a length 178 to a main breaker 180.

The load terminals of the main breaker go to a branch breaker 181, and from the load side of the branch breaker the conductors lead to a straight length 182 to a connector box 183 which leads to a distribution panelboard 185 through a length 184. The connector box also is connected to distribution panelboard 189 through flat elbows 186 and 187 and a length 188.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. A cablebus comprising a channel of U-shape having a base and straight channel sides of the U terminating at the end, a cover for the channel of U-shape having a base and parallel sides, fitting within the U of the channel and in which the sides of the U engage within the sides of the U of the channel, the upright position of the U being the same, a bridge connected across between the sides of the U of the channel above the cover, a yoke straddling the bridge and connected at each side to the top of the cover, a nut connected to the bridge, and a bolt connected from the yoke and threaded through the nut, the nut performing the function of forming threads with respect to the bridge.

2. The invention of claim 1, in combination with a notch in a side of the yoke and a fork in one position invading the notch, and preventing movement of the yoke with respect to the bridge.

3. In an enclosure for a cablebus, which is adapted to have insulated conductors threaded through it, a first member of U-shape having a base of the U and sides of the U terminating at the ends, a second member lying totally within the first member of U-shape disposed with the U in the same direction as the U of the first member, having a base of the U cooperating with the base of the first member and adapted to bear on the insulation of the conductors to exert pressure on them between the first member and the second member in one position, having sides of the U which are straight and lie within the sides of the U of the first member, a bridge connecting the sides of the U of the first member lying over the second member, a yoke supported and connected on the base of the U of the second member and enclosing the bridge, and means acting between the yoke and the bridge for exerting pressure between the first member and the second member.

4. The invention of claim 3, having at the ends of the first member outward flanges attached at the three sides adapted to join similar flanges of a similar member.

5. The invention of claim 3, in which the ends of the base of the second member have flanges which are adapted to join similar flanges on a similar member.

6. The invention of claim 3, in which said means for exerting pressure comprises a screw extending from the yoke to the bridge and a nut secured to the bridge and threaded to the screw.

7. The invention of claim 3, in which the first member has a channel in the base of the U running longitudinally, the second member has a channel in the base of the U running longitudinally and cooperating with the channel in the first member, the channels being for receiving insulation of curvilinear exterior cross section.

8. In an electrical distribution system, a channel having a U-shape having a base of the U and straight square arms of the U, a cover of the channel of U-shape in which the U has its open side positioned symmetrically to the open side of the U of the channel, consisting of a base for this U and straight sides without prolongation, the sides of this U being positioned inside and against the sides of the U of the channel, flanges on the ends of the channel and the cover, an L having end flanges connected to the flanges on the ends of the channel and the cover, having at the opposite end of the channel a second set of flanges, means for opening up the channel if desired to get wires through, a box having an inlet opening, the box being connected to the second set of flanges on the L, and cables threaded through the channel and the cover, through the L and into the box.

9. In an enclosure for a cablebus having insulated wires for threading through it, a first member of U-shape having a base of the U and sides of the U terminating at the ends, a second member of U-shape lying totally within the first member, having a base of the U cooperating with the base of the first member and adapted to bear on the insulation of the conductors, having sides of the U which are straight and lie along the sides of the U of the first member, a box secured to the ends of the first and second members, and having space to the side with respect to the longitudinal space between the members, a third member of U-shape having a base of the U and sides of the U terminating at the ends, the end of the third member being connected to the box and the third member extending at right angles to the first and second member, a fourth member lying totally within the third member, of U-shape having a base of the U cooperating with the base of the U of the third member and adapted to bear on the insulation of the conductors, having the sides of the U which are straight and lie along the sides of the U of the third member, the first and second members and the third and fourth members being adapted respectively to bring pressure on a cable which extends between them, the cable being adapted to be twisted 90° within the box.

10. In an enclosure for a cablebus which is adapted to have insulated conductors threaded through it, a first member of U-shape having a base of the U and sides of the U terminating at the ends, a second member lying totally within the first member, of U-shape having a base of the U cooperating with the base of the first member and adapted to bear on insulation of the conductors, having sides of the U which are straight and lie along the sides of the U of the first member, flanges at the ends of the first and second members, a box having openings into it and connected to the flanges, a third member of U-shape having a base of the U and sides of the U terminating at the ends, a fourth member lying totally within the third member, of U-shape having a base of the U cooperating with the base of the third member and adapted to bear on the insulation of the conductors, having sides of the U which are straight and lie along the sides of the U of the third member, the cables when installed running straight through the box, flanges at the end of the third and fourth member connected to the box around an opening, a fifth member of U-shape having a base of the U and sides of the U terminating at the ends, a sixth member lying totally within the fifth member, of U-shape having a base of the U cooperating with the base of the fifth member and adapted to bear on the insulation of the conductors, having sides of the U which are straight and along the sides of the U of the fifth member, flanges at the ends of the fifth and sixth members connected to the box around an opening at right angles to the previous flanges, a seventh member of U-shape having a base of the U and sides of the U terminating at the ends, an eighth member lying totally within the seventh member, of U-shape having a base of the U cooperating with the base of the seventh member and adapted to bear on the insulation of the conductors, having sides of the U which are straight and lie along the sides of the U of the seventh member, flanges at the ends of the seventh and eighth members connected to the box around an opening opposite to the flanges last mentioned, the conductors when threaded through by members being respectively at right angles to one another.

11. In an enclosure for a cablebus to receive insulated conductors threaded through it, a first member of U-shape having a base of the U and sides of the U terminating at the ends, a second member lying totally within the first member, of U-shape having a base of the U cooperating with the base of the first member and adapted to bear on the insulation of the conductors, having sides of the U which are straight and lie along the sides of the U of the first member, flanges at the ends of the first and second members adapted to be connected to similar flanges of similar members in prolongation, and a box having an opening in the bottom secured to the first member along its sides.

12. A cablebus comprising a longitudinal channel of U-shape having a base and straight channel sides of the U terminating at the end, an elongated cover for the channel of U-shape having a base and parallel sides, fitting within the U of the channel and in which the sides of the U engage within the sides of the U of the channel, the upright position of the U being the same, a plurality of bridges each connected across between the sides of the U of the channel above the cover, a plurality of yokes each straddling one of the bridges and connected at each side to the top of the cover, a nut connected to each of the bridges, and a bolt extending through the yokes and threaded into the nuts, the nuts performing the function of forming threads with respect to the bridges.

13. In an enclosure for a cablebus for enclosing insulated cables which are threaded through it, a first elongated member of U-shape having a base of the U and sides of the U terminating at the ends, a second elongated member lying totally within the first member, of U-shape disposed with the U in the same direction as the U of the first member, having a base of the U cooperating with the base of the U of the first member and adapted to bear on the insulation of the conductors, said second member having sides of the U which are straight and lie along the sides of the U of the first member, bridges connecting the sides of the U of the first member at spaced points above the second member, yokes corresponding in number to the bridges and supported and connected above the base of the U of the second member and enclosing the bridges, and means acting at each of the bridges to exert pressure between the bridges and the yokes.

* * * * *